United States Patent
Eckl et al.

(10) Patent No.: US 10,681,112 B2
(45) Date of Patent: Jun. 9, 2020

(54) METHOD FOR PROVIDING FUNCTIONS WITHIN AN INDUSTRIAL AUTOMATION SYSTEM, AND AN AUTOMATION SYSTEM

(71) Applicant: SIEMENS AKTIENGESELLSCHAFT, München (DE)

(72) Inventors: Roland Eckl, Forchheim (DE); Harald Herberth, Oberasbach (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 128 days.

(21) Appl. No.: 16/052,181

(22) Filed: Aug. 1, 2018

(65) Prior Publication Data
US 2019/0044997 A1 Feb. 7, 2019

(30) Foreign Application Priority Data
Aug. 2, 2017 (EP) ..................................... 17184444

(51) Int. Cl.
G06F 15/16 (2006.01)
H04L 29/08 (2006.01)
G05B 19/418 (2006.01)

(52) U.S. Cl.
CPC .......... *H04L 67/025* (2013.01); *G05B 19/418* (2013.01); *G05B 19/4185* (2013.01); *G05B 19/41835* (2013.01); *H04L 67/125* (2013.01)

(58) Field of Classification Search
CPC ... H04L 67/025; H04L 67/125; G05B 19/418; G05B 19/41835; G05B 19/4185
See application file for complete search history.

(56) References Cited

U.S. PATENT DOCUMENTS

| | | | | |
|---|---|---|---|---|
| 9,348,564 B2 * | 5/2016 | Keller | ..................... | G06F 9/451 |
| 9,354,776 B1 | 5/2016 | Subramanian et al. | | |
| 9,786,197 B2 * | 10/2017 | Asenjo | ................... | G09B 19/18 |
| 2006/0075088 A1 * | 4/2006 | Guo | ........................ | H04L 67/02 |
| | | | | 709/224 |
| 2013/0055135 A1 * | 2/2013 | Keller | ..................... | G06F 9/451 |
| | | | | 715/771 |
| 2014/0330542 A1 | 11/2014 | Subramanian et al. | | |
| 2014/0335480 A1 * | 11/2014 | Asenjo | ................... | G09B 19/18 |
| | | | | 434/107 |
| 2015/0153917 A1 | 6/2015 | Lv et al. | | |
| 2018/0240333 A1 * | 8/2018 | Meermann | ............... | B62J 99/00 |

FOREIGN PATENT DOCUMENTS

EP 2902857 A1 8/2015

* cited by examiner

*Primary Examiner* — Moustafa M Meky
(74) *Attorney, Agent, or Firm* — Henry M. Feiereisen LLC

(57) ABSTRACT

The invention relates to a method functions within an industrial automation system. In a method for providing functions within an industrial automation system, the functions are made available by a web application of at least one control unit and provided on the client side during execution of a control program via a Single-Page Application (SPA) as a web client at a client-side user interface. The functions are provided by a standardized data model of the web application which represents the at least one control unit and data that can be made available by the control unit. The standardized data model is accessed via a generic data interface of the web application.

11 Claims, 1 Drawing Sheet

METHOD FOR PROVIDING FUNCTIONS WITHIN AN INDUSTRIAL AUTOMATION SYSTEM, AND AN AUTOMATION SYSTEM

CROSS-REFERENCES TO RELATED APPLICATIONS

This application claims the priority of European Patent Application, Serial No. 17184444.2, filed Aug. 2, 2017, pursuant to 35 U.S.C. 119(a)-(d), the disclosure of which is incorporated herein by reference in its entirety as if fully set forth herein.

BACKGROUND OF THE INVENTION

The present invention relates to a method for providing functions within an industrial automation system. The invention furthermore relates to a computer program product. The invention furthermore relates to an industrial automation system.

The following discussion of related art is provided to assist the reader in understanding the advantages of the invention, and is not to be construed as an admission that this related art is prior art to this invention.

Industrial automation systems are used to monitor, control and regulate technical processes, particularly in the field of production, process and building automation, and enable an operation of control units, sensors, machinery and industrial plants which is intended to be performed as autonomously and as independently from human intervention as possible. Due to the constantly increasing importance of information technology for automation systems having numerous networked control and computer units, methods for the reliable provision of functions distributed over an automation system are becoming increasingly important for a provision of monitoring, control and regulating functions.

A multiplicity of control units, also known as PLCs (Programmable Logic Controllers), can be used in an industrial automation system. Each control unit normally provides an interface via which the respective control unit can be accessed. A multiplicity of different information elements can be retrieved via the interface, such as a current status of the control unit, configuration data of the control unit, system and user variables, diagnostic information (such as traces, alarms, logs, etc.) or a backup of a current configuration of the control unit. It is possible in some instances not only to view data but also to access and modify these data via the interface.

A web application which enables the access via http or https is installed on the control unit for this purpose. To do this, for example, individual web pages can be stored in a memory in the control unit, said pages enabling the connection to the aforementioned data and/or states of the control unit. The information is resolved in runtime on the control unit side in each case on retrieval of the respective web page and is integrated into the latter. The web page is then transmitted to a web client. A web page containing the requested data is thus created for each request from a web client.

One problem with this approach is that the web application has a very high complexity. In addition, a respective number of web pages with data integrated therein must be provided for each different control unit type. It is furthermore disadvantageous that the updating of the data on the web pages requires the reloading of the web page concerned. This may be done automatically when a web page is retrieved, for example while navigating through a plurality of pages, wherein the reloading is prompted explicitly by a user. Alternatively, an update can be performed at fixed intervals, e.g. every five seconds. As a result, a high computing load for the web application is thereby generated. From the perspective of the user, this results in a poor response time.

A Single-Page Application (SPA) refers to a web application which consists of a single HTML document and whose contents are dynamically reloaded. With a Single-Page Application, a user no longer needs to switch between individual web pages. Instead, interactions with the web application in a terminal device on the client side result in communication in the background which dynamically reloads further components of the single web page. Data can also be reloaded via different proprietary interfaces.

SUMMARY OF THE INVENTION

According to one aspect of the present invention, a method includes providing a function of an industrial automation system to a control unit by way of a web application, with the function provided on a client side during execution of a control program via a Single-Page Application (SPA) at a client-side user interface as a web client, providing the function with a standardized data model of the web application which represents the control unit and data provided by the standardized data model, and accessing the standardized data model via a generic data interface of the web application.

In accordance with a method according to the present invention, a strict separation into static resources and generic data interface is enabled. As a result, only one web client needs to be provided for different variants of a control unit. If specific functionalities are not available in a specific variant of a control unit, they are not offered in the web client for visualization and selection.

A further advantage is achieved in that the development of the web client and the development of the web application can be strictly separated from one another. It is thereby possible to optimize the web application in terms of optimum data integration. This results in reduced testing outlay, since a respective web client needs to be implemented only in relation to the generic data interface and the standardized data model which may be identical for all control units of a specific control unit type. A simulator, for example, can be used instead of using a specific control unit. On the web application side, only this interface and the access to the generic data model have to be tested. A test can thus be carried out independently from a user interface. This also offers the possibility for the web application and the web client to be provided or updated independently from one another. A simpler integration of user interfaces into the different web applications is furthermore enabled.

After the initial loading of the web client, a reduced load compared with the prior art occurs in the web application since only data structures still need to be supplied. In particular, no integration of data into web pages on the web application is required. The application itself is run entirely through the loading of static resources.

User-specific applications can be implemented more simply by storing static resources which form the web client on the web server.

According to another advantageous feature of the present invention, the data model can be configured as a hierarchical structure with nodes which relate to one another in a predefined manner. It is particularly advantageous when the data model is configured as a tree-like structure. As a result, the standardized data model can be implemented and accessed via the generic data interface in a particularly simple manner.

According to another advantageous feature of the present invention, a specific information element relating to the control unit or a datum provided by the latter can be found in the data model at the same place in the hierarchical structure during each interrogation of any given control unit. The generic data interface allows access to the hierarchical data model, which preferably has a tree-like structure. It is possible to navigate here through the hierarchy in order to be able to detect the presence or absence of (partial) elements. Conversely, the standardized data model represents the states and the data of the control unit. Specific information relating to the control unit and the data provided by it can always be found at the same place or under the same path. This simplifies the navigation, regardless of the type of control unit used.

According to another advantageous feature of the present invention, the data model can include static data and/or dynamic data. Static data are e.g. data characterizing the control unit, such as e.g. firmware information and the like. Dynamic data include status data, traces, alarms (generally: diagnostic data), user data or process data (measurement data).

According to another advantageous feature of the present invention, the structure of the data model can be accessed from the web client via the data interface in order to extract a subset of a superset of all functions of a plurality of different control units from the model and provide it at the user interface on the client side. In other words, browsing within the data structure is thereby enabled. The presence or absence of (partial) elements can be determined by means of this browsing or navigation. Elements of the data structure can be created or removed during the navigation or browsing. Alternatively or additionally, elements of the data structure can be read or written. A subscribe mechanism can furthermore be implemented which allows notification to be given in respect of changes to specific elements of the data model. Not only navigation in the data model can furthermore be allowed, but also further methods of the readable self-description of the capabilities of the control unit.

It is advantageous in this connection, when the Single-Page Application provides only data at the user interface on the client side which data is contained in the subset. It is thereby ensured that the control unit presents only data which it can process on the basis of its capabilities. Information which cannot be processed is either not shown or is e.g. grayed out.

According to another advantageous feature of the present invention, the Single-Page Application can be loaded and executed by the web client as a static resource from the web application or from a different application or from a central computer. A mobile app or a client application can be used as an alternative to the Single-Page Application, said app or client application being used instead of the Single-Page Application if the web client runs on a mobile device, such as e.g. a tablet PC and the like.

According to another advantageous feature of the present invention, the Single-Page Application can be executed in an operating and monitoring station.

According to another aspect of the invention, a non-transitory computer program product having software code segments which, when loaded into a memory of a digital computer of an industrial automation system and executed by the digital computer, cause the digital computer to execute the afore-described method.

According to still another aspect of the invention, a industrial automation system includes a control unit which includes at least one web server providing automation functions as a web application, wherein the web application includes a standardized data model which represents the at least one control unit and data provided by the at least one control unit, and a generic data interface which allows access to the data provided by the at least one control unit via the standardized data model, and an operating and monitoring station which includes a web client for client-side execution of a Single-Page Application (SPA) during execution of a control program at a client-side user interface, wherein the web client includes a superset of all functions of a plurality of control units and accesses the standardized data model via the generic data interface.

An industrial automation system according to the invention has the same advantages as those described above in connection with the method according to the invention.

The industrial automation system according to the invention may additionally include further features which enable the method according to the invention to be executed.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
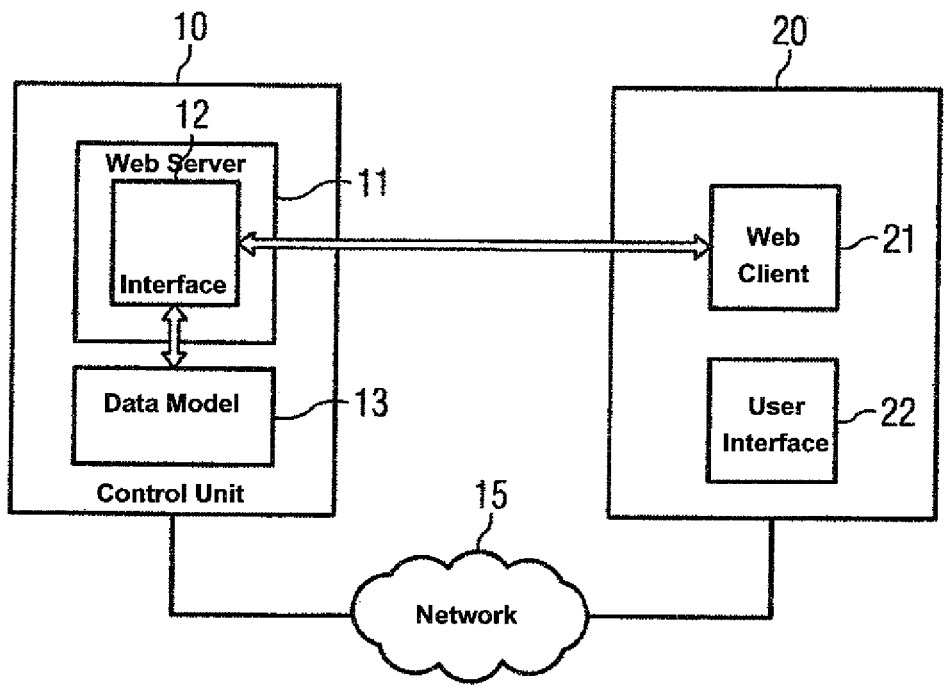
FIG. 1 is a schematic illustration of an industrial automation system for providing functions.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments may be illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a schematic illustration of an industrial automation system for providing functions. The industrial automation system includes, by way of example, only a single control unit 10 which includes a web server 11 for providing automation functions as web applications. Unlike the simplified illustration in FIG. 1, the number of control units in an industrial automation system can be much higher. The structure of the plurality of control units is then identical to the description given here. The control unit 10 is connected via a communication network 15 to at least one operating and monitoring station 20 which has a web client 21 for the linking of web applications on the client side in runtime at a user interface 22 on the client side. In the present example embodiment, the user interface 22 on the client side has a web browser. The operating and monitoring station 20 may be a stationary computer or a mobile computer (e.g. laptop, tablet PC and the like).

The web client enables the execution of a Single-Page Application (SPA) which controls the superset of all functions of a wide variety of types of control units 10 which are intended to be available via an interface of the control unit 10 in the web browser 22.

Figure 2:
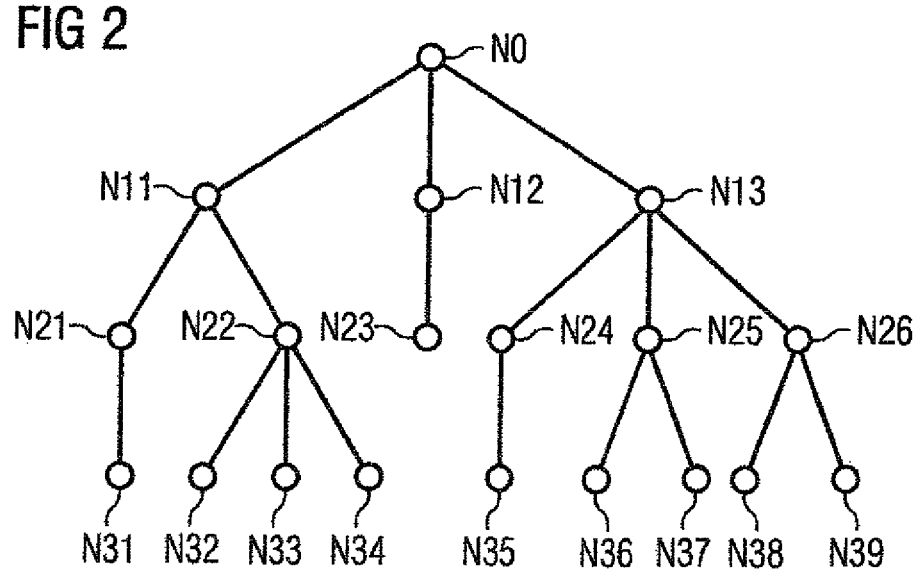
FIG. 2 is a schematic illustration of a representation of a standardized data model used in a method according to the invention.

For this purpose, the web server 11 includes a generic interface 12 which allows access to a hierarchical data model 13 which advantageously has a tree-like structure. A possible representation of the data model 13 is shown in FIG. 2. The data model includes a root node NO, by way of example three nodes N11-N13 of a first hierarchical level, by way of example six nodes N21-N26 of a second hierarchical level and by way of example nine nodes N31-N39 of a third hierarchical level. The nodes of respectively adjacent hierarchical levels are, insofar as the data model provides this, interconnected via edges in order to define relationships of the individual nodes with one another. On the basis of a structuring of the data model of this type, given purely by way of example, it is possible to represent a respective control unit 10 and the data provided by the latter. A structured data model 13 as shown in FIG. 2 allows navigation through the hierarchy using the generic data interface 12 in order to be able to detect the presence or absence of (partial) elements of the data model. Elements of the data structure can be created, removed, read and/or written e.g. via the web browser.

The standardized data model represents a respective control unit 10, its states and the data provided by the control unit. Specific information relating to the control unit and the data provided by it can always be found at the same node which is locatable under a specific path.

The web server 12 is configured not only to supply static resources to the web browser but also to implement the generic data interface and enable access to the standardized data model 13 by means of the interface.

The web client 21 is stored initially as a static resource in a memory of the control unit 10. The web client 21 is made available via the web server 11. Static resources include, in particular, HTML code, CSS code, JavaScript code, texts, graphics, and comparable files. The web client 21 can be provided as a static resource from an institution differing from the web server. The web client 21 can be supplied as part of firmware of the control unit 10 or can be individually updated without replacing the entire firmware (i.e. the firmware image) of the control unit 10. The static resource, i.e. the web client, can be configured in such a way that it is loaded from a centrally provided server which is not shown in the figures, wherein a current version of the web client is always provided without its firmware or configuration having to be modified for this purpose.

HTML code, for example, which refers in turn to JavaScript code, is loaded via an entry web page of the web client 21. The web client 21 and the associated JavaScript code are executed entirely on the client side in the web browser 22 of the operating and monitoring station 20. The web client 20 reloads static resources on demand, such as e.g. graphics and localized texts or further JavaScript code for further functionality, which have already been stored in advance.

A refresh or reload of the web page of the web client is explicitly not necessary. Conversely, no application code is executed on the web server 11 of the control unit 10 in order to dynamically generate resources.

The web client 21 represents the general framework of the application. The web client 21 accesses the underlying standardized data model 13 for content and information relating to the respective control unit 10 and its current data entirely via the generic interface 12. The standardized data model 13 includes not only static/unmodified information, but also, for example, information relating to the control unit 10, a serial number, a type, a firmware version, etc. The generic data model 13 also includes information which changes only with a configuration, such as e.g. connected peripherals, topology, into which the control unit has been incorporated, etc. In addition, the data model 13 also includes dynamic data, such as e.g. a status of the control unit or data, traces, alarms, system and user variables, watch tables and the like received via the interface of the control unit from peripheral devices or diagnostic buffers.

The navigation through the data model 13 enables the web client 21 to acquire the data provided by the web server 11 of the control unit 10. If e.g. elements relating to alarm information are contained in the standardized data model 13, a menu entry for an alarm is provided in the web client 21 and access to this partial aspect is enabled.

Whereas the web client 21 can thus take account of more functionality in the user interface of the web browser 22, only the functionality which is present in the standardized data model 13 on the respective actually allocated control unit 10 is, however, released. The web client 21 therefore advantageously always covers the full functional scope of all types of control units 10 for which it was written. However, depending on the actually present functionalities of the control unit 10, as described, only those functional aspects which are present in the standardized data model 13 are visualized and released for selection.

The data interface between the web client 21 and the web server 11 can be based on the OPC-UA access model. The design of the standardized data model 13 can similarly be based a model of an OPC-UA companion document (e.g. "OPC-UA for Devices"). In some instances, this enables the same model to be addressed in a comparable manner via different access paths. Access can thus be gained, for example, from an OPC client via an integrated OPC server and from a web browser via the web server with HTTP and JSON. At least the underlying addressing and usage model is thus known to the creator of an application, regardless of the selected access path.

The user of the operating and monitoring station 20 can simply access information from the control unit 10 with disclosure of the interface between the web client 21 and the web server 11 and the standardized data model 13 that is used. In particular, dedicated applications which are stored as static resources on the control unit 10 can be created in a simple manner.

As an alternative to the web client 21, a mobile app, for example, which accesses the data interface to the web server 11 and the subordinate standardized data model 13 can also be used as a client application.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A method, comprising:
    providing a function of an industrial automation system to a control unit by way of a web application, with the function provided on a client side during execution of a control program via a Single-Page Application (SPA) at a client-side user interface as a web client;

providing the function with a standardized data model of the web application which represents the control unit and data provided by the standardized data model; and accessing the standardized data model via a generic data interface of the web application.

2. The method of claim 1, wherein the standardized data model comprises a hierarchical structure with nodes having to a predefined relationship to one another.

3. The method of claim 2, wherein the data model has a tree-like structure.

4. The method of claim 2, wherein a specific item of information relating to the control unit or to an item of data provided by the at least one control unit can be found at an identical place in the hierarchical structure in the standardized data model during each interrogation of the at least one control unit.

5. The method of claim 1, wherein the standardized data model comprises static data and/or dynamic data.

6. The method of claim 1, wherein a structure of the standardized data model is accessed from the web client via the generic data interface in order to extract from the standardized data model a subset of a superset of all functions of a plurality of different control units and provide the subset at the client-side user interface.

7. The method of claim 6, wherein the Single-Page Application (SPA) provides at the client-side user interface only data contained in the subset.

8. The method of claim 1, wherein the Single-Page Application (SPA) is loaded and executed by the web client as a static resource from the web application or from another application or from a central computer.

9. The method of claim 1, wherein the Single-Page Application (SPA) is executed entirely in an operating and monitoring station on the client side.

10. A non-transitory computer program product having software code segments which, when loaded into a memory of a digital computer of an automation system and executed by the digital computer, cause the digital computer to provide a function of the automation system to a control unit by way of a web application, with the function being provided on a client side during execution of a control program via a Single-Page Application (SPA) at a client-side user interface as a web client, provide the function with a standardized data model of the web application which represents the at least one control unit and data provided by the standardized data model, and access the standardized data model via a generic data interface of the web application.

11. An industrial automation system, comprising:

a control unit which including at least one web server providing automation functions as a web application, wherein the web application comprises a standardized data model which represents the at least one control unit and data provided by the at least one control unit, and a generic data interface which allows access to the data provided by the at least one control unit via the standardized data model; and an operating and monitoring station which comprises a web client for client-side execution of a Single-Page Application (SPA) during execution of a control program at a client-side user interface, wherein the web client comprises a superset of all functions of a plurality of control units and accesses the standardized data model via the generic data interface.

* * * * *